(12) United States Patent
Okado et al.

(10) Patent No.: US 12,388,121 B2
(45) Date of Patent: Aug. 12, 2025

(54) METHOD FOR PRODUCING NONAQUEOUS ELECTROLYTE SECONDARY BATTERY, AND NONAQUEOUS ELECTROLYTE SECONDARY BATTERY

(71) Applicant: SANYO Electric Co., Ltd., Daito (JP)

(72) Inventors: Tetsuya Okado, Hyogo (JP); Masashi Muraoka, Hyogo (JP); Tomoharu Arai, Hyogo (JP); Atsushi Miyazaki, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 563 days.

(21) Appl. No.: 17/635,846

(22) PCT Filed: Jul. 1, 2020

(86) PCT No.: PCT/JP2020/025843
§ 371 (c)(1),
(2) Date: Feb. 16, 2022

(87) PCT Pub. No.: WO2021/065128
PCT Pub. Date: Apr. 8, 2021

(65) Prior Publication Data
US 2022/0302511 A1 Sep. 22, 2022

(30) Foreign Application Priority Data
Sep. 30, 2019 (JP) ................ 2019-180169

(51) Int. Cl.
*H01M 10/44* (2006.01)
*H01M 10/04* (2006.01)
(Continued)

(52) U.S. Cl.
CPC ..... *H01M 10/446* (2013.01); *H01M 10/0431* (2013.01); *H01M 10/049* (2013.01);
(Continued)

(58) Field of Classification Search
CPC ........... H01M 10/0431; H01M 10/049; H01M 10/0525; H01M 10/0587; H01M 10/446;
(Continued)

(56) References Cited

U.S. PATENT DOCUMENTS

2008/0241687 A1 10/2008 Ishii et al.
2012/0171536 A1 7/2012 Kaneda
(Continued)

FOREIGN PATENT DOCUMENTS

JP 2001-291526 A 10/2001
JP 2004-47332 A 2/2004
(Continued)

OTHER PUBLICATIONS

International Search Report dated Sep. 1, 2020, issued in counterpart International Application No. PCT/JP2020/025843 (3 pages).
(Continued)

*Primary Examiner* — Minh N Trinh
(74) *Attorney, Agent, or Firm* — WHDA, LLP

(57) ABSTRACT

In a method for producing a nonaqueous electrolyte secondary battery according to the present invention, a wound electrode body and a flat wound electrode body are formed by pressing. The flat wound electrode body and a cover member are connected to each other; a battery case and the cover member are integrated with each other; and a nonaqueous electrolyte solution is injected using a liquid injection port of the cover member, and the liquid injection port is sealed after the liquid injection, thereby forming a nonaqueous electrolyte secondary battery before inspection. Subsequently, the nonaqueous electrolyte secondary battery before inspection is pressed into a predetermined pressed state. A predetermined charge/discharge inspection is performed on the nonaqueous electrolyte secondary battery in the predetermined pressed state. If predetermined inspection
(Continued)

specifications are satisfied in the predetermined charge/discharge inspection, the nonaqueous electrolyte secondary battery is considered as a product that is ready for shipment.

6 Claims, 10 Drawing Sheets

(51) Int. Cl.
    *H01M 10/0587*    (2010.01)
    *H01M 10/42*    (2006.01)
    *H01M 50/497*    (2021.01)

(52) U.S. Cl.
    CPC ..... *H01M 10/0587* (2013.01); *H01M 50/497* (2021.01); *H01M 2010/4292* (2013.01)

(58) Field of Classification Search
    CPC ....... H01M 2010/4292; H01M 50/103; H01M 50/133; H01M 50/497
    See application file for complete search history.

(56) References Cited

U.S. PATENT DOCUMENTS

| | | |
|---|---|---|
| 2016/0336548 A1 | 11/2016 | Kobayashi et al. |
| 2017/0309948 A1* | 10/2017 | Azami .................. H01M 4/625 |
| 2019/0123319 A1* | 4/2019 | Shimura ............. H01M 50/414 |
| 2020/0028130 A1 | 1/2020 | Marutani |
| 2022/0302511 A1* | 9/2022 | Okado ................ H01M 10/446 |

FOREIGN PATENT DOCUMENTS

| | | |
|---|---|---|
| JP | 2004-259485 A | 9/2004 |
| JP | 2005-149763 A | 6/2005 |
| JP | 2007-103295 A | 4/2007 |
| JP | 2008-47304 A | 2/2008 |
| JP | 2009-104902 A | 5/2009 |
| JP | 2010-21104 A | 1/2010 |
| JP | 2013-115033 A | 6/2013 |
| JP | 2013-125650 A | 6/2013 |
| JP | 2014-56728 A | 3/2014 |
| JP | 2014-82157 A | 5/2014 |
| JP | 2015-65065 A | 4/2015 |
| JP | 2016-105415 A | 6/2016 |
| JP | 2016-219143 A | 12/2016 |
| WO | 2018/008135 A1 | 1/2018 |

OTHER PUBLICATIONS

Extended (Supplementary) European Search Report dated Jun. 25, 2024, issued in counterpart EP application No. 20872725.5. (8 pages).

* cited by examiner

METHOD FOR PRODUCING NONAQUEOUS ELECTROLYTE SECONDARY BATTERY, AND NONAQUEOUS ELECTROLYTE SECONDARY BATTERY

TECHNICAL FIELD

The present disclosure relates to a method of producing a non-aqueous electrolyte secondary battery, and to a non-aqueous electrolyte secondary battery, and in particular to a method of producing a non-aqueous electrolyte secondary battery which includes a flat-shape, rolled-type electrode element, and to the non-aqueous electrolyte secondary battery.

BACKGROUND

Lithium ion batteries are becoming widely spread for usages for equipment onto vehicles such as electric vehicles and hybrid electric vehicles, in addition to consumer usages such as in cellphones and in laptop computers. In particular, rectangular lithium ion batteries are used having a superior volume efficiency when the battery is made into a module. In order to achieve a higher capacity, that is, a higher electrode occupancy ratio per unit volume, a flat-shape, rolled-type electrode element which does not have a space in an internal circumference portion is used as the electrode element.

When the flat-shape, rolled-type electrode element is employed as the electrode element, the electrode element repeatedly expands and contracts during charging and discharging, which may result in a flexure due to waviness on a flat portion of the electrode element, and also loosening in which the rolling is uncoiled due to reduction of a rolling tension. When the flexure and the loosening occurs in the flat-shape, rolled-type electrode element, performance as the secondary battery is degraded.

Patent Literature 1 describes that the flexure and the loosening of the flat-shape, rolled-type electrode element in the rectangular lithium ion battery may be suppressed by setting a ratio (L/W), between a length L of the flat-shape, rolled-type electrode element along a rolling direction and a thickness W, to greater than or equal to 1.7 and less than or equal to 3.8.

Patent Literature 2 describes that the flexure of the flat-shape, rolled-type electrode element in the rectangular lithium ion battery may be suppressed by the flat-shape, rolled-type electrode element being pressurized in a thickness direction by a battery casing or the like. In this document, experimental results are described for 8 Examples and 4 Comparative Examples, in relation to an electrode element thickness ratio which is a ratio between an inner size of a "battery casing before the flat-shape, rolled-type electrode element is housed", and an outer size "in the thickness direction, of the flat-shape, rolled-type electrode element housed in the battery casing during discharging". When the electrode element thickness ratio is less than 1.01, sufficient constraining force is not applied to the flat-shape, rolled-type electrode element during the discharge, the flexure occurs in the flat-shape, rolled-type electrode element, and a cycle capacity maintaining property is reduced. When the electrode element thickness ratio is greater than 1.03, the size of the battery casing with respect to the flat-shape, rolled-type electrode element during the discharging is too small, and the flexure of the flat-shape, rolled-type electrode element and expansion of the battery casing become significant. This document describes that, thus, the electrode element thickness ratio is desirably in a range from 1.01 to 1.03.

As an art related to the present disclosure, Patent Literature 3 describes that a part of a small amount of moisture and electrolyte components contained in battery members are decomposed on the surface of the electrode during a charging of the first time in a sealed lithium ion battery, resulting in generation of a gas, and, consequently, a high internal pressure of the battery. Here, after the battery casing housing the electrode element and an electrolyte solution is sealed under a reduced pressure, a pressure is applied to the battery casing by a constraint plate or the like when the battery is charged for the first time. With this process, a part of the electrolyte solution is decomposed to generate a gas, and a film is formed over a surface of a negative electrode active material. As a consequence, an interface between the negative electrode surface and the electrolyte solution can be stabilized. The generated gas may be smoothly discharged from the electrode surface by the reduced pressure during the sealing and a pressure load during the charging of the first time, and thus, the increase in the internal pressure can be suppressed.

CITATION LIST

Patent Literature

Patent Literature 1: JP 2013-115033 A
Patent Literature 2: JP 2014-082157 A
Patent Literature 3: JP 2013-125650 A

SUMMARY

In order to suppress flexure which may be caused due to expansion and contraction of the flat-shape, rolled-type electrode element during charging and discharging in a non-aqueous electrolyte secondary battery, pressurizing the flat-shape, rolled-type electrode element from an outside of the battery casing is effective, but when the pressurization is too strong, deformation of the battery casing may occur, and deformation of a pressurization jig may occur. On the other hand, when the pressurization is weak, the flexure cannot be effectively suppressed. Thus, a method of producing the non-aqueous electrolyte secondary battery is desired in which the flexure which may be caused due to expansion and contraction of the flat-shape, rolled-type electrode element can be effectively suppressed.

According to one aspect of the present disclosure, there is provide a method of producing a non-aqueous electrolyte secondary battery, the method including: a non-aqueous electrolyte secondary battery production step including: producing a flat-shape, rolled-type electrode element using a positive electrode plate, a negative electrode plate, and a separator placed between the positive electrode plate and the negative electrode plate and having an ion transmissivity; housing an insert including the flat-shape, rolled-type electrode element in a battery casing having an opening; closing the opening of the battery casing using a lid element; and injecting a non-aqueous electrolyte solution into the battery casing; after the non-aqueous electrolyte secondary battery production step, pressurizing a predetermined pressurization region at an outer side of the battery casing with a pressurization jig, so as to realize a predetermined pressurization state in which an in-battery-casing occupancy ratio N1 of the insert is $0.92 \leq N1 < 0.98$, wherein N1 is a ratio (E1/T1) between a total thickness E1 of the insert in the battery casing including the flat-shape, rolled-type electrode element along a direction parallel to a thickness direction of the flat-shape, rolled-type electrode element in the battery casing in a pressurized state, and an inner size T1 of the battery casing; and executing a charge/discharge inspection under the predetermined pressurization state.

According to another aspect of the present disclosure, there is provided a non-aqueous electrolyte secondary battery in which a flat-shape, rolled-type electrode element having a positive electrode plate, a negative electrode plate, and a separator placed between the positive electrode plate and the negative electrode plate and having ion transmissivity is housed in a battery casing along with a non-aqueous electrolyte, and, in the flat-shape, rolled-type electrode element, when an actual length along a trajectory path of an innermost rolling trajectory connecting respective ends of an innermost rolling portion is C1 and a straight line distance connecting respective ends of the innermost rolling trajectory is S1, $1.000 < (C1/S1) < 1.001$.

According to the method of producing the non-aqueous electrolyte secondary battery of the configuration described above and the non-aqueous electrolyte secondary battery of the configuration described above, the flexure caused by the expansion and contraction of the flat-shape, rolled-type electrode element can be effectively suppressed.

DESCRIPTION OF EMBODIMENTS

Figure 1:
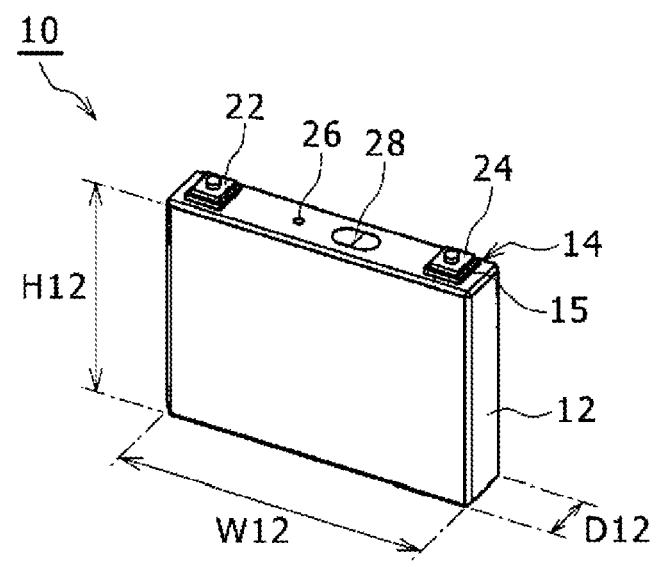
FIG. 1 is an outer appearance diagram of a non-aqueous electrolyte secondary battery produced using a method of producing a non-aqueous electrolyte secondary battery according to an embodiment of the present disclosure.
Figure 1:
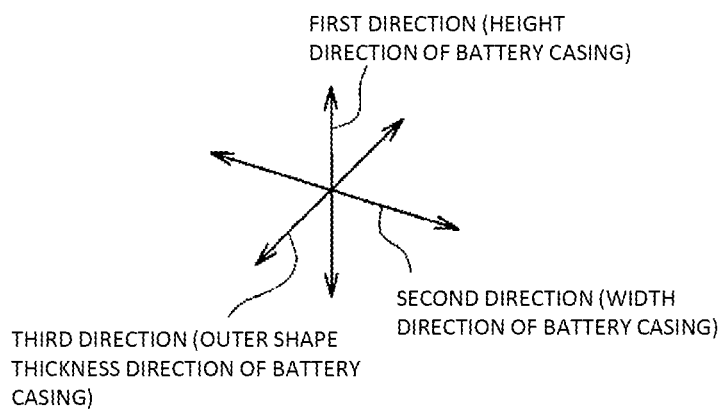

An embodiment of the present disclosure will now be described in detail with reference to the drawings. A material, a size, a shape or the like described below are exemplar) merely for the purpose of explanation, and may be arbitrarily changed according to the specification of the non-aqueous electrolyte secondary battery. In the following, corresponding element over all drawings are assigned the same reference numeral, and will not be repeatedly described.

FIG. 1 is a perspective diagram of an outer appearance of a non-aqueous electrolyte secondary battery 10. In the following, unless otherwise stated, the non-aqueous electrolyte secondary battery 10 is also simply called a secondary battery 10. The secondary battery 10 is a rectangular lithium ion battery comprising a battery casing 12 of a rectangular parallelepiped shape with a cylindrical shape with a bottom, and having a quadrangular opening on a ceiling side, and a lid element 14 which closes the quadrangular opening of the battery casing 12.

Figure 2:
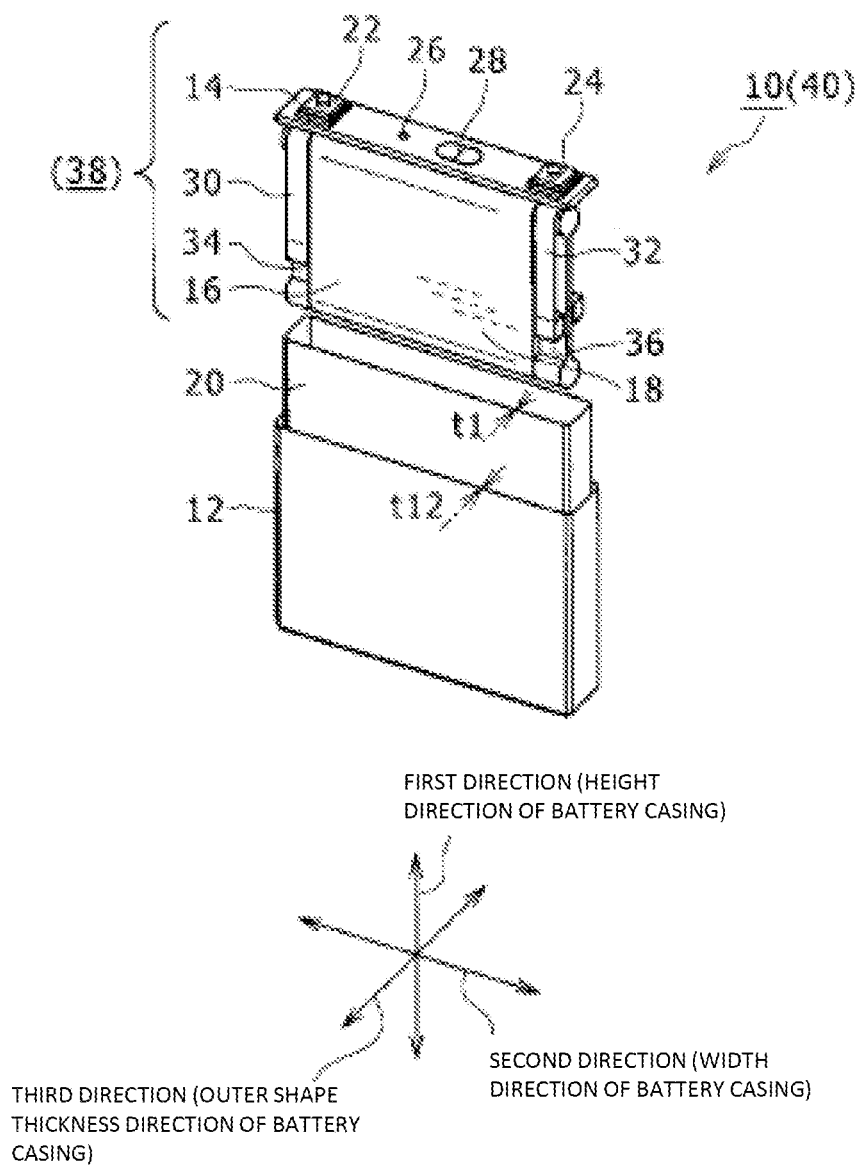
FIG. 2 is an exploded view of the non-aqueous electrolyte secondary battery of FIG. 1.

FIG. 2 is a cross-sectional diagram showing an internal structure of the secondary battery 10, by separating the battery casing 12 and the lid element 14. At an inside of the secondary battery 10, a flat-shape, rolled-type electrode element 16 is provided in which a positive electrode and a negative electrode are layered with a separator therebetween, and rolled in a flat shape. In the following, unless otherwise stated, the flat-shape, rolled-type electrode element 16 will also be simply called an electrode element 16. In the inside of the secondary battery 10, in addition to the electrode element 16, a non-aqueous electrolyte solution 18 impregnated in the electrode element 16, and an electrode element holder 20 which is an insulating element for electrically insulating the electrode element 16 and the battery casing 12 are provided.

FIG. 1 shows, as three orthogonal directions, a first direction, a second direction, and a third direction. The first direction is a direction from a bottom of the battery casing 12 toward the lid element 14, and corresponds to a height direction of the battery casing 12. The second direction is a direction in which a long side of the quadrangular opening of the battery casing 12 extends, and corresponds to a width direction of the battery casing 12. The third direction is a direction in which a short side of the quadrangular opening of the battery casing 12 extends, and corresponds to a thickness direction of the outer shape of the battery casing 12. The directions are similarly shown in the other drawings.

The battery casing 12 is a rectangular canned element having the quadrangular opening, and a structure in which a suitable metal material is integrally shaped in a predetermined shape is used. An outer height which is an outer shape size along the first direction of the battery casing 12 as a single entity is shown as H12, an outer width which is an outer shape size along the second direction is shown as W12, and an outer thickness which is an outer shape size along the third direction is shown as D12. The outer shape size of the battery casing 12 as the single entity refers to an outer shape size of the battery casing 12 in which nothing is housed in the rectangular parallelepiped shape having a cylindrical shape with a bottom, and having the quadrangular opening on the ceiling side.

A length of the long side of the quadrangular opening of the battery casing 12 as the single entity is the outer shape size along the second direction and is W12. A length of the short side of the quadrangular opening of the battery casing 12 is the outer shape size along the third direction and is D12. With regard to outer shape sizes of five side surfaces of the battery casing, two side surfaces having the long side of the quadrangular opening have an outer shape size of (W12×H12), two side surfaces having the short side of the quadrangular opening have an outer shape size of (D12×H12), and one side surface formed from the long side and the short side of the quadrangular opening has an outer shape size of (W12×D12). A size of the battery casing 12 as the single entity is set according to a battery capacity (Ah) of the secondary battery 10.

A thickness t12 of each wall of the battery casing 12 may be suitably set according to the overall size of the battery casing 12, but in order to set the electrode element 16 in a predetermined pressurization state by a pressurization performed during a charge/discharge inspection, to be described below, the thickness must be suitably thinned. As a material of the battery casing 12 of the secondary battery 10 for equipment in vehicles, aluminum or an aluminum alloy is employed in many cases. In this case, the thickness of each wall is set to $t12 \leq 1.0$ mm. The charge/discharge inspection and the predetermined pressurization state will be described later.

The lid element 14 includes a quadrangular plate portion 15 having a size to enable liquid-tightly blocking of the quadrangular opening of the battery casing 12. For a material of the quadrangular plate portion 15, a material is chosen which can be integrated by joining such as welding with the battery casing 12. For the material of the quadrangular plate portion 15, a material identical to that of the battery casing 12 may be employed.

The lid element 14 comprises two external terminals including a positive electrode external terminal 22 and a negative electrode external terminal 24 which protrude toward an outer side in the first direction of the secondary battery 10 when the lid element 14 is integrated with the battery casing 12, a solution injection port 26, and a gas discharge port 28 in the quadrangular plate portion 15. The positive electrode external terminal 22 is electrically insulated from the quadrangular plate portion 15 with an insulating member therebetween. The negative electrode external terminal 24 is electrically insulated from the quadrangular plate portion 15 with an insulating member therebetween.

The positive electrode external terminal 22 and the negative electrode external terminal 24 are respectively connected to an electrode element positive electrode 34 and an electrode element negative electrode 36 of the electrode element 16 via a positive electrode electricity collector plate 30 and a negative electrode electricity collector plate 32. With these connections, a lid element with an electrode element 38 is formed in which the electrode element 16 and the lid element 14 are mechanically and electrically integrated. The lid element with the electrode element 38 immediately after the mechanical and electrical integration does not yet include the non-aqueous electrolyte solution 18.

The electrode element holder 20 is a sheet element of an insulating material shaped in a shape covering a portion related to the electrode element 16, in order to prevent electrical connection between a portion of the electrode element 16 of the lid element with the electrode element 38 with an inner wall portion of the battery casing 12 when the lid element with the electrode element 38 and the battery casing 12 are integrated. For a material of the electrode element holder 20, an electrically insulating resin having a resistance to the non-aqueous electrolyte solution 18 is employed. FIG. 2 shows a thickness of the electrode element holder 20 as t1. As an example, t1 may be about 0.15 mm.

The solution injection port 26 is an opening for injecting the non-aqueous electrolyte solution 18 into the battery casing 12 after the portion of the electrode element 16 of the lid element with the electrode element 38 is inserted into the battery casing 12 in which the electrode element holder 20 is placed, and the battery casing 12 and the lid element 14 are integrated by welding or the like. When the non-aqueous electrolyte solution 18 is injected and the solution injection port 26 is sealed, and, with this process, a non-aqueous electrolyte secondary battery before inspection 40 is formed. A predetermined charge/discharge inspection is performed on the non-aqueous electrolyte secondary battery before the inspection 40, to result in the secondary battery 10 which is a product.

The gas discharge port 28 is a gas vent hole for discharging the gas to the outside of the secondary battery 10 when gas is generated during charging or discharging of the secondary battery 10, and the internal pressure of the secondary battery 10 exceeds a predetermined value.

Figure 3:
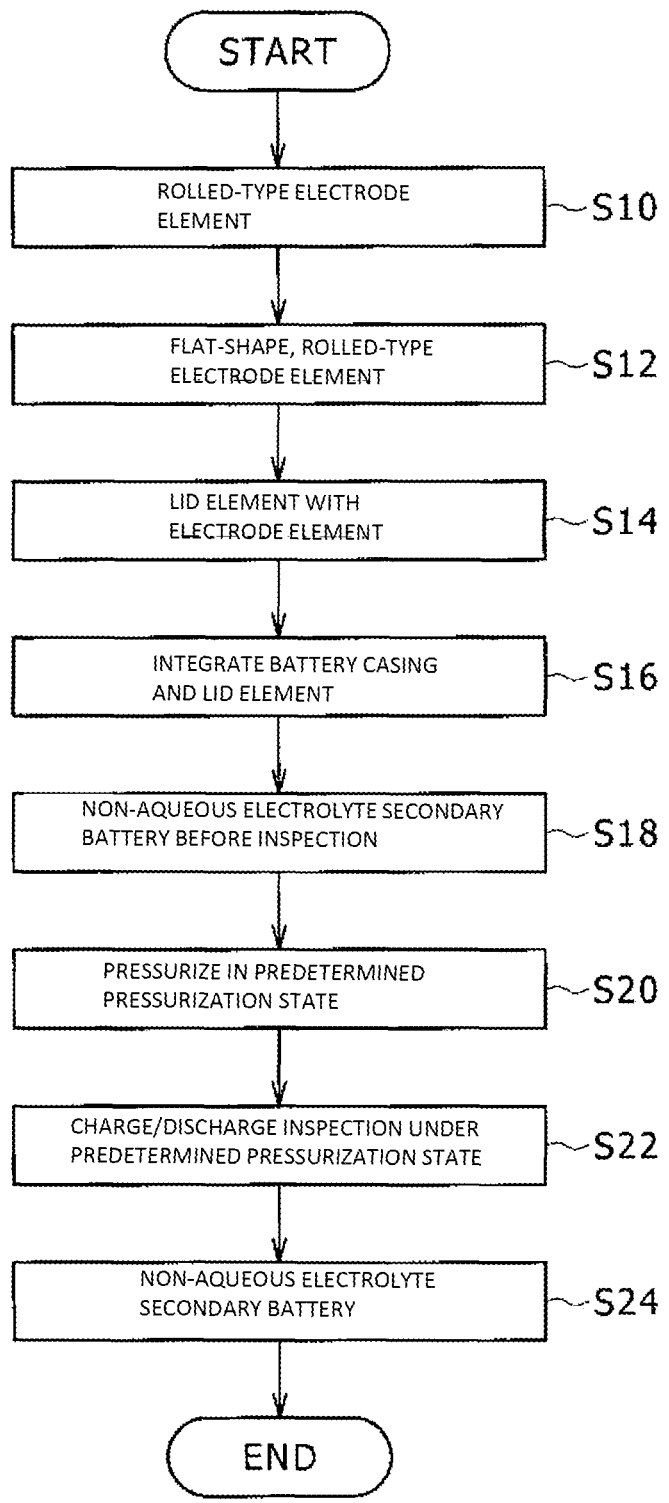
FIG. 3 is a flowchart showing steps of a method of producing a non-aqueous electrolyte secondary battery according to an embodiment of the present disclosure.

Next, a method of producing the secondary battery 10 having the above-described structure will be described. FIG. 3 is a flowchart showing steps of the method of producing the secondary battery 10.

Figure 4A:
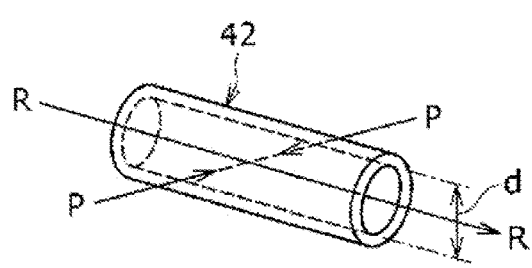
FIG. 4(a) is a diagram showing a rolled-type electrode element.
Figure 4B:
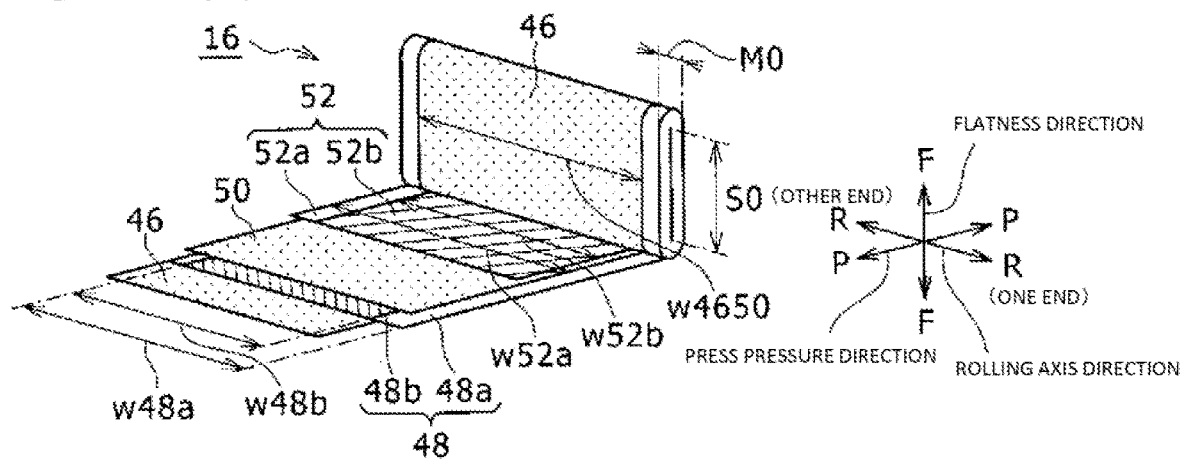
FIG. 4(b) is a diagram showing a flat-shape, rolled-type electrode element.

In FIG. 3, a process begins with formation of a rolled-type electrode element 42 (refer to FIG. 4(a) and FIG. 4(b)) (S10). The formed rolled-type electrode element 42 is flattened and shaped by press machining, to form the electrode element 16 (S12).

FIG. 4(a) is a perspective diagram of the rolled-type electrode element 42. FIG. 4(b) is a developed view of the electrode element 16. With reference to the developed view of FIG. 4(b), the rolled-type electrode element 42 is a rolled element in which one separator 46, one positive electrode plate 48, one separator 50, and one negative electrode plate 52 are layered in this order in the thickness direction, and the resulting structure is rolled in a cylindrical shape around a rolling axis R-R. In FIG. 4(a), d shows an inner size dimension of the rolled-type electrode element 42, and corresponds to, for example, an outer size dimension of the rolled shaft element.

The electrode element 16 is an element in which the cylindrical rolled element of the rolled-type electrode element 42 is compressed and shaped by press machining to a predetermined electrode element thickness M0. The electrode element 16 is obtained by applying the press machining on the rolled-type electrode element 42 in a P-P direction perpendicular to the rolling axis R-R using a press machine, and shaping the cylindrical shape of the rolled-type electrode element 42 into the flat shape. In the example configuration of FIG. 4(a) and FIG. 4(b), the inner size d of the rolled-type electrode element 42 is collapsed by the press machining, and the electrode element 16 is obtained in which there is almost no gap in an inner circumferential portion, and which has a size of a straight-shape, innermost rolling portion of S0.

FIG. 4(b) shows, with regard to the electrode element 16, three orthogonal directions including an R-R direction, a P-P direction, and an F-F direction. With reference to FIG. 4(a), the R-R direction is the rolling axis direction, and the P-P direction is a pressing pressure direction of the press machining for machining into the flat shape. The F-F direction is a direction orthogonal to both the R-R direction and the P-P direction, and is a direction in which a flat portion of the flat shape extends by the press machining. Thus, this direction is called a flatness direction. With reference to FIG. 2, when the electrode element 16 is housed in the battery casing 12 of the secondary battery 10, the electrode element 16 is placed in such a manner that the F-F direction which is the flatness direction is parallel to the first direction, the R-R direction which is the rolling axis direction is parallel to the second direction, and the P-P direction which is the press pressure direction is parallel to the third direction.

In the developed view of FIG. 4(a) and FIG. 4(b), development on an outermost circumference side is shown. Specifically, the outermost circumference is the separator 46, the positive electrode plate 48 is layered over the separator 46, the separator 50 is layered over the positive electrode plate 48, and the negative electrode plate 52 is layered over the separator 50. In this example configuration, the innermost side is the negative electrode plate 52, but this configuration is merely exemplary for the purpose of explanation, and, alternatively, the outermost circumference side may be the negative electrode plate 52, and the innermost circumference side may be the positive electrode plate 48.

The positive electrode plate 48 is formed by applying and drying a positive electrode active material mixture layer 48b serving as a positive electrode slurry over both surfaces of an aluminum-based metal foil 48a which is a positive electrode core serving as a metal electricity collector plate which is conductive. The positive electrode active material mixture layer 48b includes a positive electrode active material. The aluminum-based metal refers to aluminum or an aluminum alloy having aluminum as a primary constituent. The positive electrode active material includes a lithium transition metal composite oxide which can occlude and release lithium ions.

The negative electrode plate 52 is formed by applying and drying a negative electrode active material mixture layer 52b serving as a negative electrode slurry over both surfaces of a copper-based metal foil 52a which is a negative electrode core serving as a metal electricity collector plate which is conductive. The negative electrode active material mixture layer 52b includes a negative electrode active material. The copper-based metal is copper or a copper alloy having copper as a primary constituent. The negative electrode active material is a carbonaceous material.

The separators 46 and 50 are films placed between the positive electrode plate 48 and the negative electrode plate 52, and formed from an ion transmissive material.

FIG. 4(b) shows sizes of the positive electrode plate 48, the negative electrode plate 52, and the separators 46 and 50 along the rolling axis direction of the electrode element 16. A width size of the aluminum-based metal foil 48a of the positive electrode plate 48 is shown as a positive electrode core width w48a, and a width size of the positive electrode active material mixture layer 48b is shown as a positive electrode application width w48b. A width size of the copper-based metal foil 52a of the negative electrode plate 52 is shown as a negative electrode core width w52a, and a width size of the negative electrode active material mixture layer 52b is shown as a negative electrode application width w52b. Width sizes of the separators 46 and 50 are shown as a separator width w4650. These width sizes are sizes along the rolling axis direction.

In the positive electrode plate 48, the positive electrode application width w48b is set to be narrower than the positive electrode core width w48a, and the positive electrode application width w48b is placed near the side of the other end of the respective ends of the positive electrode core width w48a in the width direction. In the example configuration of FIG. 4(b), in the positive electrode plate 48, a width region is provided at the side of the one end along the rolling axis direction, in which the positive electrode active material mixture layer 48b is not applied and the aluminum-based metal foil 48a is exposed. This width region in which the aluminum-based metal foil 48a is exposed is used as the electrode element positive electrode 34 at the one end of the electrode element 16 along the rolling axis.

In the negative electrode plate 52, the negative electrode application width w52b is set to be narrower than the negative electrode core width w52a, and the negative electrode application width w52b is placed near the side of the one end of respective ends of the negative electrode core width w52a in the width direction. In the example configuration of FIG. 4(b), in the negative electrode plate 52, a width region is provided at the side of the other end along the rolling axis direction, in which the negative electrode active material mixture layer 52b is not applied and the copper-based metal foil 52a is exposed. This width region in which the copper-based metal foil 52a is exposed is used as the electrode element negative electrode 36 at the other end of the electrode element 16 along the rolling axis.

Figure 5:
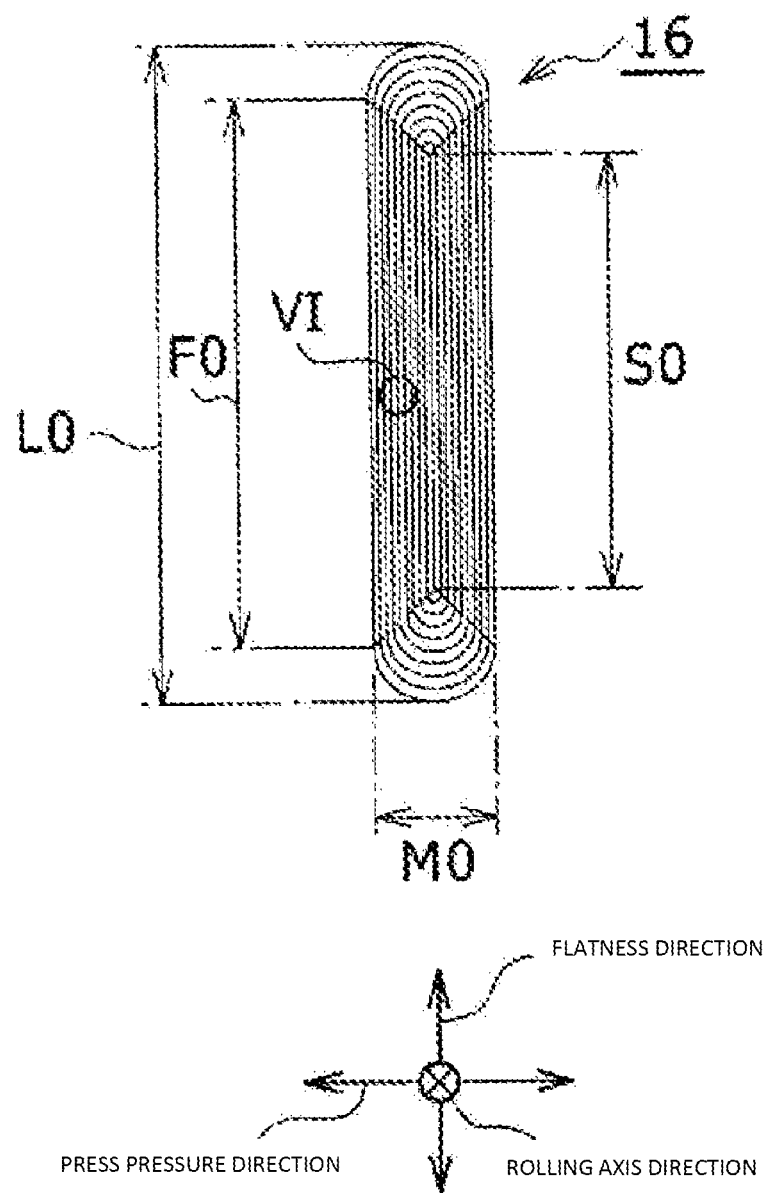
FIG. 5 is a cross-sectional diagram of the flat-shape, rolled-type electrode element of FIG. 4(b).

FIG. 5 is a cross-sectional diagram of the electrode element 16 perpendicular to the rolling axis direction. A thickness M0 of the electrode element 16 is a thickness size parallel to the press pressure direction, and is a thickness size parallel to the third direction which is the thickness direction of the battery casing 12 when the electrode element 16 is housed in the battery casing 12. An overall length L0 of the electrode element 16 along the flatness direction is a size parallel to the first direction which is the height direction of the battery casing 12 when the electrode element 16 is housed in the battery casing 12. A size F0 of extension of the flat portion of the flat shape of the electrode element 16 in the flatness direction is shorter than the overall length L0 and longer than the size S0 of the innermost rolling portion along the flatness direction. That is, L0>F0>S0.

Figure 6:
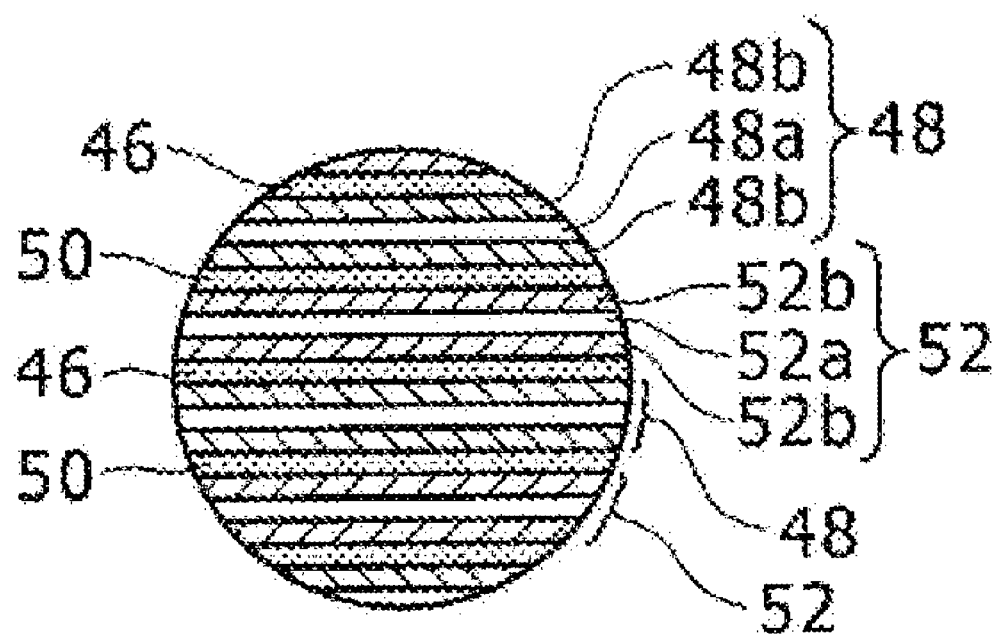
FIG. 6 is an enlarged view of a VI part of FIG. 5.

FIG. 6 is an enlarged view of a VI part of FIG. 5. In the positive electrode plate 48, the positive electrode active material mixture layer 48b is applied over both surfaces of the aluminum-based metal foil 48a, and, in the negative electrode plate 52, the negative electrode active material mixture layer 52b is applied over both surfaces of the copper-based metal foil 52a. The separators 46 and 50 are placed between the positive electrode active material mixture layer 48b and the negative electrode active material mixture layer 52b. Because the separators 46 and 50 have ion transmissivity, when the electrode element 16 is immersed in the non-aqueous electrolyte solution 18, ions may be circulated between the positive electrode plate 48 and the negative electrode plate 52, and thus, the electrode element 16 is set in a chargeable and dischargeable state.

Referring again to FIG. 3, after the electrode element 16 is shaped, the lid element with the electrode element 38 is formed (S14). The electrode element 16 has on one end in the rolling direction the electrode element positive electrode 34 and on the other end the electrode element negative electrode 36. The electrode element positive electrode 34 of the electrode element 16 is connected to the positive electrode external terminal 22 of the lid element 14 via the positive electrode electricity collector plate 30, and the electrode element negative electrode 36 of the electrode element 16 is connected to the negative electrode external terminal 24 of the lid element 14 via the negative electrode electricity collector plate 32, to form the lid element with the electrode element 38 (refer to FIG. 2).

Next, the battery casing 12 and the lid element 14 are integrated (S16). In this process, the electrode element holder 20 is placed in an internal space of a quadrangular cylinder shape of the battery casing 12. The lid element with the electrode element 38 is positioned in such a manner that the rolling axis direction of the electrode element 16 is parallel to the second direction of the battery casing 12, and a periphery of the electrode element 16 of the lid element with the electrode element 38 is covered by the electrode element holder 20. The lid element with the electrode element 38 is then inserted along the first direction of the battery casing 12 into the internal space of the battery casing 12. After the lid element with the electrode element 38 is placed without a gap and covering the ceiling-side opening of the battery casing 12, the battery casing 12 and the lid element 14 are integrated using a joining means such as welding on combining portions of the battery casing 12 and the lid element 14.

Figure 7:
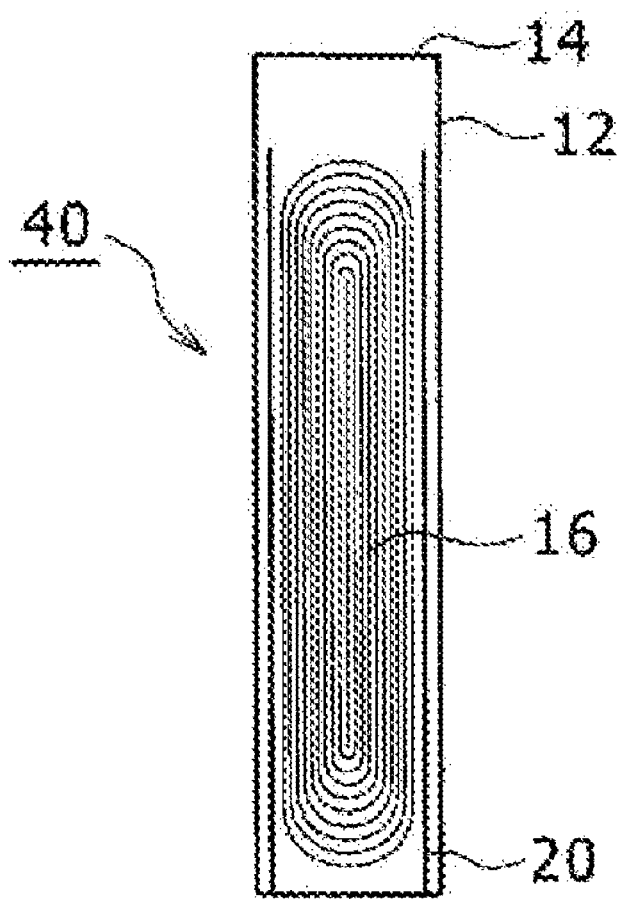
FIG. 7 is a cross-sectional diagram of a non-aqueous electrolyte secondary battery.
Figure 7:
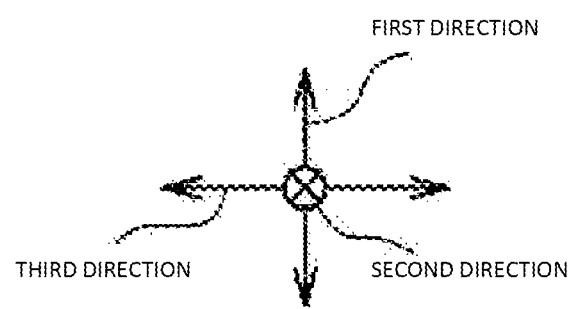

When the integration of the battery casing 12 and the lid element 14 is completed, the non-aqueous electrolyte solution 18 is injected with a predetermined injection amount Q using the solution injection port 26 of the lid element 14. For the non-aqueous electrolyte solution 18, a solution is used in which ethylene carbonate (EC), ethylmethyl carbonate (EMC), dimethyl carbonate (DMC), or the like is used as a non-aqueous solvent, and lithium hexafluorophosphate (LiPF$_6$) is added to the solvent as an electrolyte salt. This is merely exemplary for the purpose of explanation, and other constituting materials may be used depending on the specification of the non-aqueous electrolyte secondary battery 10. After the solution injection, the structure is left for a certain time period to allow sufficient immersion of the electrode element 16 in the non-aqueous electrolyte solution 18, a provisional charging is performed, and the solution injection port 26 is sealed. With this process, the non-aqueous electrolyte secondary battery before inspection 40 is formed (S18). FIG. 7 is a cross-sectional diagram of the non-aqueous electrolyte secondary battery before inspection 40.

When the non-aqueous electrolyte secondary battery before inspection 40 is formed, the charge/discharge inspection is performed before the non-aqueous electrolyte secondary battery 10 is shipped as the product. In this process, in order to prevent flexure of the electrode element 16 due to charging and discharging, the charge/discharge inspection is performed under the predetermined pressurization state. For this purpose, the non-aqueous electrolyte secondary battery 40 is pressurized in the predetermined pressurization state before the charge/discharge inspection (S20).

Figure 8:
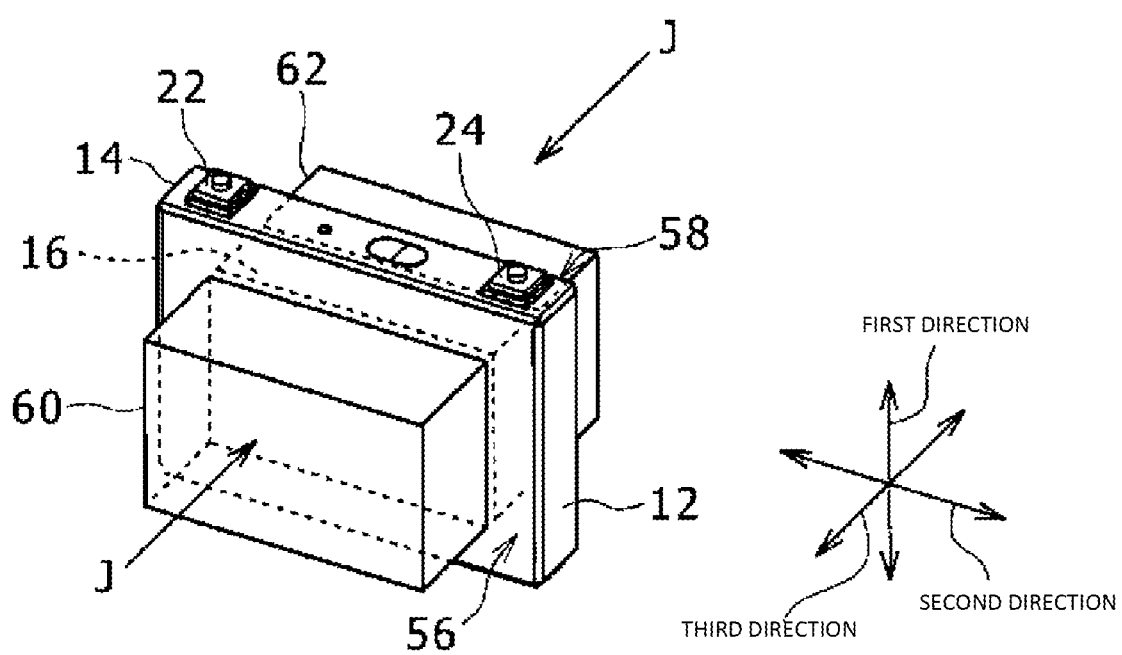
FIG. 8 is a diagram showing a non-aqueous electrolyte secondary battery which is pressurized using a pressurization jig.

The pressurization is applied to the two side surfaces 56 and 58 which are perpendicular to the third direction of the battery casing 12, which include the long side of the quadrangular opening of the battery casing 12, and which have an outer shape area of (W12×H12), using pressurization jigs 60 and 62 from an outer side of the battery casing 12. FIG. 8 shows a state in which the pressurization jig 60 is applied on the side surface 56, the pressurization jig 62 is applied on the side surface 58, and pressures J are applied in opposing directions.

The pressurization jigs 60 and 62 are applied to predetermined pressurization regions of the side surfaces 56 and 58. The predetermined pressurization regions are set corresponding to a housing position of the electrode element 16 in the battery casing 12. A length of the predetermined pressurization region along the second direction may be an overall length of the electrode element 16 along the second direction. A length L1 of the predetermined pressurization region along the first direction is set according to a shape of the flatly rolled shape of the electrode element 16.

Figure 9:
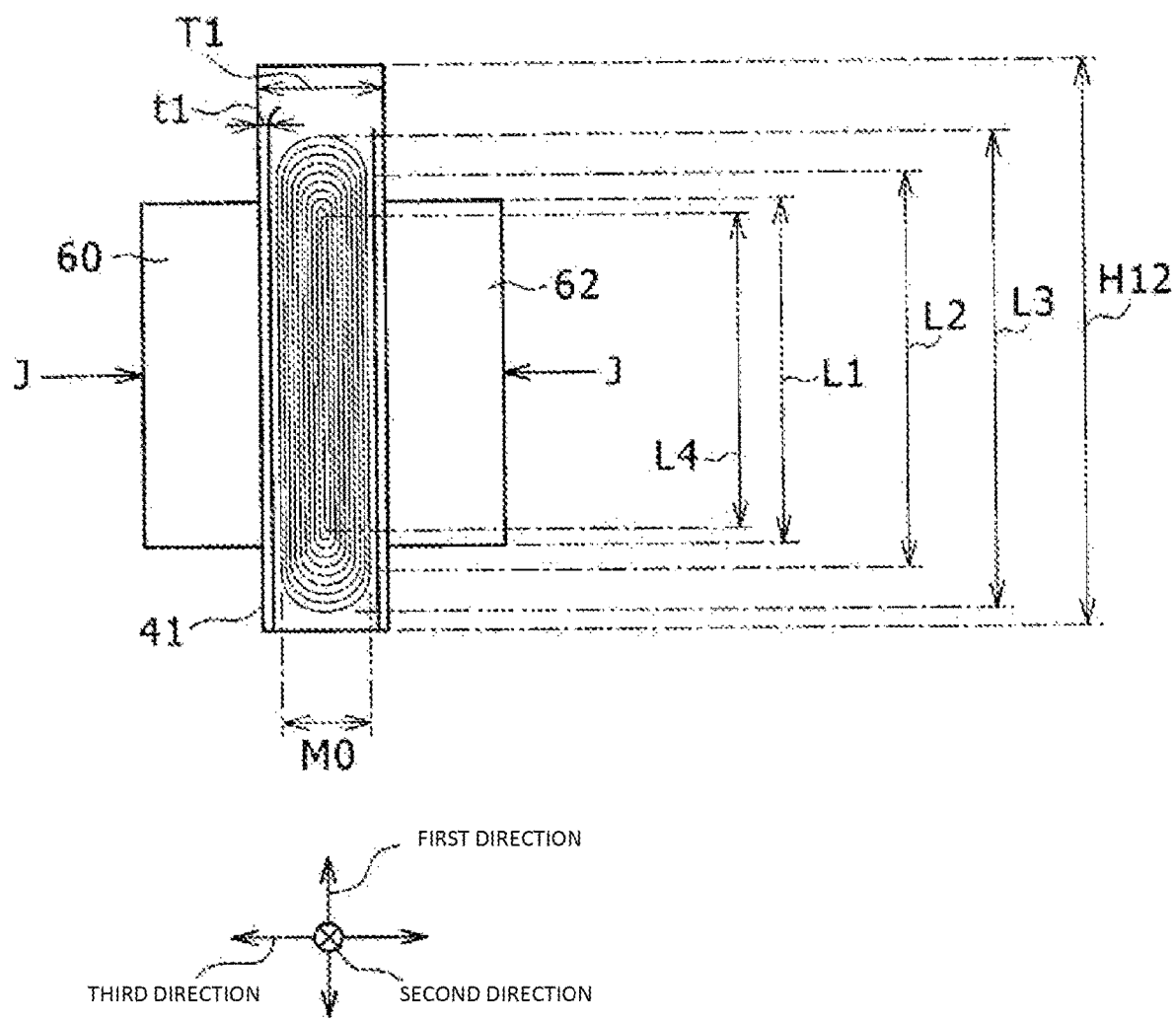
FIG. 9 is a cross-sectional diagram of the battery of FIG. 8, cut along a direction of the pressurization.

FIG. 9 is a cross-sectional diagram which is cut along the pressurization direction of the pressure J of FIG. 8. With reference to FIG. 9, setting of the length L1 of the predetermined pressurization region along the first direction will be described. In FIG. 9, a length along the first direction of the flat portion of the flat shape of the electrode element 16 is L2. An overall length of the electrode element 16 along the first direction is L3. A length between respective ends of the innermost rolling portion of the electrode element 16 along the first direction is L4. The length L4 between the respective ends of the innermost rolling portion of the electrode element 16 equals to a length between a first folding portion A which is a position of a folding portion closest to a rolling start in the innermost rolling portion of the electrode element 16 and a second folding portion B which is a position of an initial folding portion at a side opposite from the first folding portion A along the first direction. Using L2, L3, and L4 described above, the length L1 of the predetermined pressurization region along the first direction is set to satisfy conditions of L1≤L2, L1<L3, and L1≥L4.

The predetermined pressurization state is a state in which the pressure J is set such that a condition is satisfied that 0.92≤N1<0.98, where N1 is a an in-battery-casing occupancy ratio of the insert, which is defined as a ratio of a total thickness E1 of the insert placed in the battery casing 12 with respect to an inner size T1 of the battery casing 12. The parameters T1 and E1 for defining N1 are values in the pressurization state. The total thickness E1 of the insert is a sum of the thickness M0 of the electrode element 16 and a value twice the thickness t1 of the electrode element holder 20, and thus, E1=(M0+2×t1). FIG. 9 shows relationships among T1, M0, and t1 in the pressurization state.

The inner size T1 of the battery casing 12 is an opening inner side size at the short side of the quadrangular opening when the pressure J is applied in a state in which the insert and the non-aqueous electrolyte solution 18 are placed in the internal space of the battery casing 12. The inner size T1 differs from the opening inner side size at the short side of the quadrangular opening in the battery casing 12 as the single entity, which is described above with reference to FIG. 1.

The thickness M0 of the electrode element 16 is the thickness M0 of the electrode element 16 as the single entity, which is described above with reference to FIG. 5. The thickness t1 of the electrode element holder 20 is a small value in comparison to T1 and M0, and thus, the influences of the non-aqueous electrolyte solution 18 and the pressure J may be ignored.

Referring again to FIG. 3, when the non-aqueous electrolyte secondary battery before inspection 40 is pressurized in the predetermined pressurization state, the predetermined charge/discharge inspection is performed on the non-aqueous electrolyte secondary battery 40 in the predetermined pressurization state (S22). The predetermined charge/discharge inspection may include, for example, an initial charging step, a high-temperature aging step, and a property checking step. In the initial charging step, for example, the battery is charged under an environment of 25° C., to an SOC of 40 to 80%. In the high-temperature aging step, for example, the battery is left for 12 to 24 hours under an environment of higher than or equal to 60° C. In the property checking step, for example, the battery is charged to an SOC of 100% under an environment of 25° C., and is then discharged to 0%.

If a predefined inspection specification is satisfied in the predetermined charge/discharge inspection, the secondary battery is recognized as the non-aqueous electrolyte secondary battery 10 which can be shipped as a product (S24).

The method of producing the non-aqueous electrolyte secondary battery 10 has been described. Next, an advantage of performing the predetermined charge/discharge inspection under the predetermined pressurization state will be described with reference to results of actually producing 9 secondary batteries and checking a state of flexure in the electrode element 16 after the predetermined charge/discharge inspection.

As shown in FIG. 5, in the electrode element 16 immediately after shaping through the press machining, there is almost no gap in the inner circumference portion, and the innermost rolling portion extends in a straight line shape with a size S0. When this electrode element 16 is housed in the battery casing 12 and is immersed in the non-aqueous electrolyte solution 18, and the battery is charged and discharged, the innermost rolling portion becomes a non-straight line shape, and flexure is caused. The deformation from the straight line shape to the non-straight line shape may be considered as a type of buckling. Therefore, the flexure of the electrode element 16 due to the charging and discharging will be evaluated using a buckling index value described below.

After performance of the predetermined charge/discharge inspection, an actual length along a trajectory path of an innermost rolling trajectory connecting the respective ends of the innermost rolling portion of the electrode element 16 is described as C1, and a straight line distance connecting respective ends of the innermost rolling trajectory is described as S1. When there is no flexure in the innermost rolling portion. (C1/S1)=1.000. On the other hand, when flexure is caused in the innermost rolling portion, C1 becomes larger than S1 (C1>S1), and (C1/S1) exceeds 1.000 and is increased as the flexure becomes more significant. Therefore, the parameter (C1/S1) is set as the buckling index value.

Figure 10:
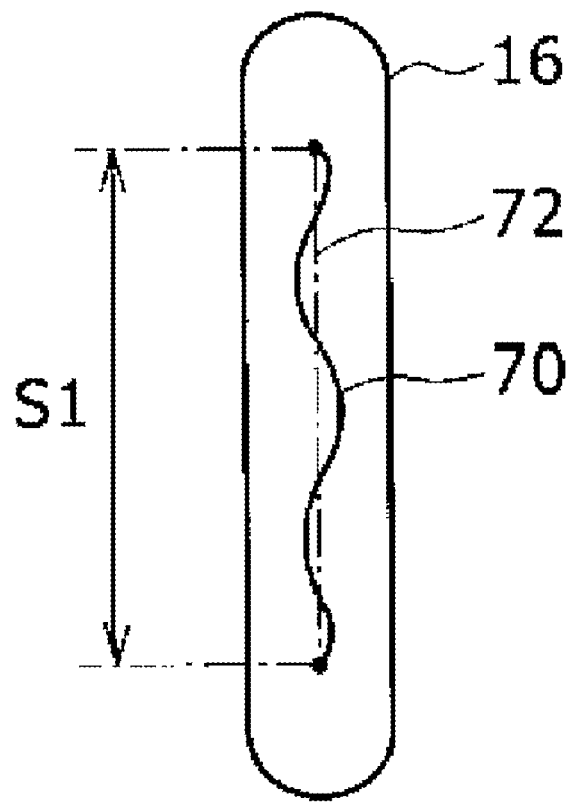
FIG. 10 is a diagram showing an example of measurement of flexure of a flat-shape, rolled-type electrode element using an X-ray CT.

The innermost rolling trajectory in the electrode element 16 after the charge/discharge inspection can be measured using an X-ray CT method. FIG. 10 shows an example of an X-ray CT image for the electrode element 16 after the charge/discharge inspection. Here, images of the plurality of rolls of the positive electrode plate 48, the negative electrode plate 52, and the separators 46 and 50 are not shown. In the example configuration of FIG. 10, a significant flexure is caused in an innermost rolling trajectory 70. The actual length C1 of the innermost rolling trajectory 70 along the trajectory path is significantly long in comparison to the distance S1 between the ends of a straight line 72 connecting the respective ends of the innermost rolling trajectory 70, and (C1/S1) is significantly larger than 1.000.

A total of 9 secondary batteries including 4 Examples and 5 Comparative Examples were produced. TABLE 1 summarizes various parameters, and relationships between the in-battery-casing occupancy ratio N1 of the insert and the buckling index value (C1/S1). On the vertical axis of TABLE 1, various parameters of the secondary batteries are shown, and, on the horizontal axis of TABLE 1, Examples 1 to 4 and Comparative Example 1 to 5 are shown.

TABLE 1

| | | 1 EXAMPLE1 | 2 COMPARATIVE EXAMPLE1 | 3 EXAMPLE2 | 4 COMPARATIVE EXAMPLE2 | 5 EXAMPLE3 | 6 COMPARATIVE EXAMPLE3 | 7 COMPARATIVE EXAMPLE4 | 8 COMPARATIVE EXAMPLE5 | 9 EXAMPLE4 |
|---|---|---|---|---|---|---|---|---|---|---|
| 1 POSITIVE ELECTRODE CORE WIDTH | W48a | 121 | 105 | 105 | 127 | 127 | 132 | 132 | 132 | 132 |
| 2 POSITIVE ELECTRODE APPLICATION WIDTH | W48b | 105 | 90 | 90 | 108 | 108 | 117 | 117 | 117 | 117 |
| 3 NEGATIVE ELECTRODE CORE WIDTH | W52a | 123 | 107 | 107 | 130 | 130 | 134 | 134 | 134 | 134 |
| 4 NEGATIVE ELECTRODE APPLICATION WIDTH | W52b | 110 | 95 | 95 | 113 | 113 | 122 | 122 | 122 | 122 |
| 5 SEPARATOR WIDTH | W4650 | 115 | 100 | 100 | 119 | 119 | 127 | 127 | 127 | 127 |
| 6 ELECTRODE ELEMENT THICKNESS | M0 | 11.2 | 10.3 | 10.6 | 15.5 | 15.5 | 23.0 | 23.1 | 23.3 | 24.0 |
| 7 BATTERY CASING OUTER SHAPE THICKNESS | D12 | 13.4 | 12.5 | 12.5 | 17.5 | 17.5 | 26.5 | 26.5 | 26.5 | 26.5 |
| 8 BATTERY CASING OUTER SHAPE WIDTH | W12 | 137 | 120 | 120 | 148 | 148 | 148 | 148 | 148 | 148 |
| 9 BATTERY CASING OUTER SHAPE HEIGHT | H12 | 63.3 | 85 | 85 | 65 | 65 | 91 | 91 | 91 | 91 |
| 10 BATTERY CASING THICKNESS | t12 | 0.4 | 0.5 | 0.5 | 0.5 | 0.5 | 0.7 | 0.7 | 0.7 | 0.7 |
| 11 INJECTION AMOUNT | Q | 50 | 50 | 60 | 60 | 60 | 150 | 150 | 150 | 150 |
| 12 BATTERY CASING INNER SIZE WHEN PRESSURIZED | T1 | 12.3 | 11.8 | 11.8 | 16.8 | 16.42 | 25.4 | 25.4 | 25.4 | 25.4 |

TABLE 1-continued

| | | 1 EXAMPLE1 | 2 COMPARATIVE EXAMPLE1 | 3 EXAMPLE2 | 4 COMPARATIVE EXAMPLE2 | 5 EXAMPLE3 | 6 COMPARATIVE EXAMPLE3 | 7 COMPARATIVE EXAMPLE4 | 8 COMPARATIVE EXAMPLE5 | 9 EXAMPLE4 |
|---|---|---|---|---|---|---|---|---|---|---|
| 13 | IN-BATTERY-CASING OCCUPANCY RATIO OF INSERT | N1 | 0.93 | 0.90 | 0.92 | 0.94 | 0.96 | 0.92 | 0.92 | 0.93 | 0.96 |
| 14 | PREDETERMINED PRESSURIZATION REGION LENGTH | L1 | | | | | 41.4 | | | | |
| 15 | ELECTRODE ELEMENT FLAT PORTION LENGTH | L2 | | | | | 42.0 | | | | |
| 16 | ELECTRODE ELEMENT OVERALL LENGTH | L3 | | | | | 57.5 | | | | |
| 17 | ELECTRODE ELEMENT INNERMOST ROLLING PORTION LENGTH | L4 | | | | | 40.1 | | | | |
| 18 | BUCKLING INDEX VALUE | (C1/S1) | 1.0005 | 1.0171 | 1.0006 | 1.0052 | 1.0007 | 1.0128 | 1.0148 | 1.0079 | 1.0004 |
| 19 | BATTERY CAPACITY | | 4 | 5 | 5 | 8 | 8 | 25 | 35 | 30 | 25 |

The parameters on the vertical axis of TABLE 1 are arranged in the rolling manner from an upper side toward a lower side on the page. The unit of the size is mm, the unit of the injection amount is g, and the unit of battery capacity is Ah.

Down to a fifth row from the uppermost row, there are shown the positive electrode core width w48*a*, the positive electrode application width w48*b*, the negative electrode core width w52*a*, the negative electrode application width w52*b*, and the separator width w4650. A sixth row from the uppermost row shows the thickness M0 of the electrode element 16 after the press. A seventh row to a tenth row from the uppermost row respectively show the outer shape thickness D12 along the third direction for the battery casing 12 as the single entity, the outer shape width W12 along the second direction, the outer shape height H12 along the first direction, and the thickness t12 of the battery casing 12. An eleventh row from the uppermost row shows the injection amount Q of the non-aqueous electrolyte solution 18.

A twelfth row from the uppermost row shows the inner size T1 of the battery casing 12 along the third direction in the pressurization state before the charge/discharge inspection. A thirteenth row from the uppermost row shows a calculated value of the in-battery-casing occupancy ratio N1 of the insert, which is equal to (E1/T1). The total thickness E1 of the insert in the battery casing 12 is calculated by adding twice the thickness of the electrode element holder 20 (t1=0.15 mm) to the thickness M0 of the electrode element 16.

A fourteenth row to a seventeenth row from the uppermost row show the length L1 of the predetermined pressurization region along the first direction, and the lengths L2, L3, and L4 described above with reference to FIG. 9. An eighteenth row from the uppermost row shows the buckling index value (C1/S1). A nineteenth row from the uppermost row shows the battery capacity.

For the secondary batteries along the vertical axis of TABLE 1, to a third column from the leftmost column, Example 1, Comparative Example 1, and Example 2 are shown from the left side to the right side on the page, as example configurations having the outer shape thickness D12 of the battery casing 12 along the third direction of less than 17 mm. From a fourth column from the leftmost column, Comparative Example 2, Example 3, Comparative Example 3, Comparative Example 4, Comparative Example 5, and Example 4 are shown as examples having the outer shape thickness D12 of the battery casing 12 along the third direction of greater than or equal to 17 mm and less than or equal to 27 mm. Details of these 9 secondary batteries will be described below.

In Example 1, the positive electrode plate 48 was formed with the positive electrode core width w48*a* of 121 mm and the positive electrode application width w48*b* of 105 mm, and the negative electrode plate 52 was formed with the negative electrode core width w52*a* of 123 mm and the negative electrode application width w52*b* of 110 mm. Using the separators 46 and 50 with the separator width w4650 of 115 mm, the rolled-type electrode element 42 was formed, and the electrode element 16 was shaped through the press machining. The thickness M0 of the electrode element 16 after the press was 11.2 mm. The electrode element 16 was covered with the electrode element holder 20 having a thickness of 0.15 mm, and the assembly was inserted into the battery casing 12 having the outer shape thickness D12 of 13.4 mm, the outer shape width W12 of 137 mm, the outer shape height H12 of 63.3 mm, and the thickness t12 of 0.4 mm. The non-aqueous electrolyte solution 18 was injected with the injection amount Q of 50 g, and the solution injection port 26 was closed, to form the non-aqueous electrolyte secondary battery before inspection 40. The battery capacity was 4 Ah.

For the non-aqueous electrolyte secondary battery 40 of Example 1, a predetermined charge/discharge inspection was performed. Before the charge/discharge inspection, the secondary battery was pressurized with the pressurization jigs 60 and 62. In the following, unless otherwise stated, for the pressurization jigs 60 and 62, jigs were employed which pressurize the entire surfaces of the side surfaces 56 and 58 of the non-aqueous electrolyte secondary battery 40. The inner size T1 of the battery casing 12 during the pressurization before the charge/discharge inspection was 12.3 mm, and the in-battery-case occupancy ratio N1 of the insert was 0.93. The buckling index value after the charge/discharge inspection. (C1/S1), was 1.0005, and thus was less than or equal to 1.001.

In Comparative Example 1, the positive electrode plate 48 was formed with the positive electrode core width w48a of 105 mm and the positive electrode application width w48b of 90 mm, and the negative electrode plate 52 was formed with the negative electrode core width w52a of 107 mm and the negative electrode application width w52b of 95 mm. Using the separators 46 and 50 with the separator width w4650 of 100 mm, the rolled-type electrode element 42 was formed, and the electrode element 16 was shaped through the press machining. The thickness M0 of the electrode element 16 after the press was 10.3 mm. The electrode element 16 was covered with the electrode element holder 20 having a thickness of 0.15 mm, and the assembly was inserted into the battery casing 12 having the outer shape thickness D12 of 12.5 mm, the outer shape width W12 of 120 mm, the outer shape height H12 of 85 mm, and the thickness t12 of 0.5 mm. The non-aqueous electrolyte solution 18 was injected with the injection amount Q of 50 g, and the solution injection port 26 was closed, to form the non-aqueous electrolyte secondary battery before inspection 40. The battery capacity was 5 Ah.

For the non-aqueous electrolyte secondary battery 40 of Comparative Example 1, a predetermined charge/discharge inspection was performed. The secondary battery was pressurized with the pressurization jigs 60 and 62 before the charge/discharge inspection. The inner size T1 of the battery casing 12 during the pressurization before the charge/discharge inspection was 11.8 mm, and the in-battery-casing occupancy ratio N1 of the insert was 0.90. The buckling index value after the charge/discharge inspection, (C1/S1), was 1.0171, and thus was greater than or equal to 1.001.

In Example 2, the positive electrode plate 48 was formed with the positive electrode core width w48a of 105 mm and the positive electrode application width w48b of 90 mm, and the negative electrode plate 52 was formed with the negative electrode core width W52a of 107 mm and the negative electrode application width w52b of 95 mm. Using the separators 46 and 50 with the separator width w4650 of 100 mm, the rolled-type electrode element 42 was formed. These conditions are identical to those of Comparative Example 1. The electrode element 16 was shaped through the press machining. The thickness M0 of the electrode element 16 after the press was 10.6 mm. The electrode element 16 was covered with the electrode element holder 20 having a thickness of 0.15 mm, and the assembly was inserted in the battery casing 12 having the outer shape thickness D12 of 12.5 mm, the outer shape width W12 of 120 mm, the outer shape height H12 of 85 mm, and the thickness t12 of 0.5 mm. The conditions of the battery casing 12 are identical to those of Comparative Example 1. The non-aqueous electrolyte solution 18 was injected with the injection amount Q of 60 g, and the solution injection port 26 was closed, to form the non-aqueous electrolyte secondary battery before inspection 40. The battery capacity was 5 Ah.

For the non-aqueous electrolyte secondary battery 40 of Example 2, a predetermined charge/discharge inspection was performed. The secondary battery was pressurized with the pressurization jigs 60 and 62 before the charge/discharge inspection. The inner size T1 of the battery casing 12 during the pressurization before the charge/discharge inspection was 11.8 mm, and was identical to Comparative Example 2, but the in-battery-casing occupancy ratio N1 of the insert was 0.92. The buckling index value after the charge/discharge inspection, (C1/S1), was 1.0006, and thus was less than or equal to 1.001.

In Comparative Example 2, the positive electrode plate 48 was formed with the positive electrode core width w48a of 127 mm and the positive electrode application width w48b of 108 mm, and the negative electrode plate 52 was formed with the negative electrode core width w52a of 130 mm and the negative electrode application width w52b of 113 mm. Using the separators 46 and 50 with the separator width w4650 of 119 mm, the rolled-type electrode element 42 was formed, and the electrode element 16 was shaped through the press machining. The thickness M0 of the electrode element 16 after the press was 15.5 mm. The electrode element 16 was covered with the electrode element holder 20 having a thickness of 0.15 mm, and the assembly was inserted into the battery casing 12 having the outer shape thickness D12 of 17.5 mm, the outer shape width W12 of 148 mm, the outer shape height H12 of 65 mm, and the thickness t12 of 0.5 mm. The non-aqueous electrolyte solution 18 was injected with the injection amount Q of 60 g, and the solution injection port 26 was closed, to form the non-aqueous electrolyte secondary battery before inspection 40. The battery capacity was 8 Ah.

For the non-aqueous electrolyte secondary battery 40 of Comparative Example 2, a predetermined charge discharge inspection was performed. The secondary battery was pressurized with the pressurization jigs 60 and 62 before the charge/discharge inspection. The inner size T1 of the battery casing 12 during the pressurization before the charge/discharge inspection was 16.8 mm, and the in-battery-casing occupancy ratio N1 of the insert was 0.94. The buckling index value after the charge/discharge inspection, (C1/S1), was 1.0052, and thus was greater than or equal to 1.001.

In Example 3, the positive electrode plate 48 was formed with the positive electrode core width w48a of 127 mm and the positive electrode application width w48b of 108 mm, and the negative electrode plate 52 was formed with the negative electrode core width w52a of 130 mm and the negative electrode application width w52b of 113 mm. Using the separators 46 and 50 with the separator width w4650 of 119 mm, the rolled-type electrode element 42 was formed, and the electrode element 16 was shaped through the press machining. The thickness M0 of the electrode element 16 after the press was 15.5 mm. The electrode element 16 was covered with the electrode element holder 20 having a thickness of 0.15 mm, and the assembly was inserted into the battery casing 12 having the outer shape thickness D12 of 17.5 mm, the outer shape width W12 of 148 mm, the outer shape height H12 of 65 mm, and the thickness t12 of 0.5 mm. The non-aqueous electrolyte solution 18 was injected with the injection amount Q of 60 g, and the solution injection port 26 was closed, to form the non-aqueous electrolyte secondary battery before inspection 40. The battery capacity was 8 Ah. These conditions are identical to those of Comparative Example 2.

For the non-aqueous electrolyte secondary battery 40 of Example 3, a predetermined charge/discharge inspection was performed. The secondary battery was pressurized with the pressurization jigs 60 and 62 before the charge/discharge inspection. The inner size T1 of the battery casing 12 during the pressurization before the charge/discharge inspection was 16.42 mm, and the in-battery-casing occupancy ratio N1 of the insert was 0.96.

Here, the predetermined pressurization region described above with reference to FIG. 9 for compressing beyond the outer size of the battery casing 12 during the pressurization has H12 of 65 mm, L1 of 41.4 mm, L2 of 42.0 mm, L3 of 57.5 mm, and L4 of 40.1 mm. Tus, L1≤L2. L1<L3, and L1≥L4. The secondary battery was pressurized at the predetermined pressurization region, so that the in-battery-casing occupancy ratio N1 of the insert was 0.96. The buckling index value after the charge/discharge inspection, (C1/S1), was 1.0007, and thus was less than or equal to 1.001.

In Comparative Example 3, the positive electrode plate 48 was formed with the positive electrode core width w48a of 132 mm and the positive electrode application width w48b of 117 mm, and the negative electrode plate 52 was formed with the negative electrode core width w52a of 134 mm and the negative electrode application width w52b of 122 mm. Using the separators 46 and 50 with the separator width w4650 of 127 mm, the rolled-type electrode element 42 was formed, and the electrode element 16 was shaped through the press machining. The thickness M0 of the electrode element 16 after the press was 23.0 mm. These conditions have greater values than Example 1, Example 2, Example 3, Comparative Example 1, and Comparative Example 2. The electrode element 16 was covered with the electrode element holder 20 having a thickness of 0.15 mm, and the assembly was inserted into the battery casing 12 having the outer shape thickness D12 of 26.5 mm, the outer shape width W12 of 148 mm, the outer shape height H12 of 91 mm, and the thickness t12 of 0.7 mm. The non-aqueous electrolyte solution 18 was injected with the injection amount Q of 150 g, and the solution injection port 26 was closed, to form the non-aqueous electrolyte secondary battery before inspection 40. The battery capacity was 25 Ah.

For the non-aqueous electrolyte secondary battery 40 of Comparative Example 3, a predetermined charge/discharge inspection was performed. The secondary battery was pressurized with the pressurization jigs 60 and 62 before the charge/discharge inspection. The inner size T1 of the battery casing 12 during the pressurization before the charge/discharge inspection was 25.4 mm, and the in-battery-casing occupancy ratio N1 of the insert was 0.92. The buckling index value after the charge/discharge inspection, (C1/S1), was 1.0128, and thus was greater than or equal to 1.001.

In Comparative Example 4, the positive electrode plate 48 was formed with the positive electrode core width w48a of 132 mm and the positive electrode application width w48b of 117 mm, and the negative electrode plate 52 was formed with the negate electrode core width w52a of 134 mm and the negative electrode application width w52b of 122 mm. Using the separators 46 and 50 with the separator width w4650 of 127 mm, the rolled-type electrode element 42 was formed. These conditions are identical to those of Comparative Example 3. The electrode element 16 was shaped through the press machining, and the thickness M0 of the electrode element 16 after the press was 23.1 mm, which was thicker than the thickness in Comparative Example 3. The electrode element 16 was covered with the electrode element holder 20 having a thickness of 0.15 mm, and the assembly was inserted into the battery casing 12 having the outer shape thickness D12 of 26.5 mm, the outer shape width W12 of 148 mm, the outer shape height H12 of 91 mm, and the thickness t12 of 0.7 mm. The non-aqueous electrolyte solution 18 was injected with the injection amount Q of 150 g. These conditions are identical to those of Comparative Example 3. The solution injection port 26 was closed, to form the non-aqueous electrolyte secondary battery before inspection 40. The battery capacity was 35 Ah.

For the non-aqueous electrolyte secondary battery 40 of Comparative Example 4, a predetermined charge/discharge inspection was performed. The secondary battery was pressurized with the pressurization jigs 60 and 62 before the charge/discharge inspection. The inner size T1 of the battery casing 12 during the pressurization before the charge/discharge inspection was 25.4 mm, and the in-battery-casing occupancy ratio N1 of the insert was 0.92. These values are identical to those in Comparative Example 3. The buckling index value after the charge/discharge inspection. (C1/S1), was 1.0148, and thus was greater than or equal to 1.001.

In Comparative Example 5, the positive electrode plate 48 was formed with the positive electrode core width w48a of 132 mm and the positive electrode application width w48b of 117 mm, and the negative electrode plate 52 was formed with the negative electrode core width w52a of 134 mm and the negative electrode application width w52b of 122 mm. Using the separators 46 and 50 with the separator width w4650 of 127 mm, the rolled-type electrode element 42 was formed. These conditions are identical to those in Comparative Example 3 and Comparative Example 4. The electrode element 16 was shaped through the press machining, and the thickness M0 of the electrode element 16 after the press was 23.3 mm, which was thicker than those of Comparative Example 3 and Comparative Example 4. The electrode element 16 was covered with the electrode element holder 20 having a thickness of 0.15 mm, and the assembly was inserted into the battery casing 12 having the outer shape thickness D12 of 26.5 mm, the outer shape width W12 of 148 mm, the outer shape height H12 of 91 mm and the thickness t12 of 0.7 mm. These conditions are identical to those of Comparative Example 3 and Comparative Example 4. The non-aqueous electrolyte solution 18 was injected with the injection amount Q of 150 g. This value is identical to those of Comparative Example 3 and Comparative Example 4. The solution injection port 26 was closed, to form the non-aqueous electrolyte secondary battery before inspection 40. The battery capacity was 30 Ah.

For the non-aqueous electrolyte secondary battery 40 of Comparative Example 5, a predetermined charge/discharge inspection was performed. The secondary battery was pressurized with the pressurization jigs 60 and 62 before the charge/discharge inspection. The inner size T1 of the battery casing 12 during the pressurization before the charge/discharge inspection was 25.4 mm, and the in-battery-casing occupancy ratio N1 of the insert was 0.93. These values are greater than the values in Comparative Example 3 and Comparative Example 4. The buckling index value after the charge/discharge inspection, (C1/S1), was 1.0079, and thus was greater than or equal to 1.001.

In Example 4, the positive electrode plate 48 was formed with the positive electrode core width w48a of 132 mm and the positive electrode application width w48b of 117 mm, and the negative electrode plate 52 was formed with the negative electrode core width w52a of 134 mm and the negative electrode application width w52b of 122 mm. Using the separators 46 and 50 with the separator width w4650 of 127 mm, the rolled-type electrode element 42 was formed. These conditions are identical to those of Comparative Example 3, Comparative Example 4, and Comparative Example 5. The electrode element 16 was shaped through the press machining, and the thickness M0 of the electrode element 16 after the press was 24.0 mm, which was thicker than those in Comparative Example 3, Comparative Example 4, and Comparative Example 5. The electrode element 16 was covered with the electrode element holder 20 having a thickness of 0.15 mm, and the assembly was inserted into the battery casing 12 having the outer shape thickness D12 of 26.5 mm, the outer shape width W12 of 148 mm, the outer shape height H12 of 91 mm, and the thickness t12 of 0.7 mm. The non-aqueous electrolyte solution 18 was injected with the injection amount Q of 150 g. These conditions are identical to those of Comparative Examples 3 to 5. The solution injection port 26 was closed, to form the non-aqueous electrolyte secondary battery before inspection 40. The battery capacity was 25 Ah.

For the non-aqueous electrolyte secondary battery 40 of Example 4, a predetermined charge/discharge inspection was performed. The secondary battery was pressurized with the pressurization jigs 60 and 62 before the charge/discharge inspection. The inner size T1 of the battery casing 12 during the pressurization before the charge/discharge inspection was 25.4 mm, and the in-battery-casing occupancy ratio N1 of the insert was 0.96. These values are greater than those of Comparative Example 3, Comparative Example 4, and Comparative Example 5. The buckling index value after the charge/discharge inspection, (C1/S1), was 1.0004, and thus was less than or equal to 1.001.

The relationships between in-battery-casing occupancy ratios N1 of the insert and the buckling index values (C1/S1) for the four Examples and the five Comparative Examples from TABLE 1 are summarized in TABLE 2. TABLE 2 also shows the outer shape thickness D12 of the battery casing 12 for each case.

TABLE 2

| | BATTERY CASING OUTER SHAPE THICKNESS D12 | IN-BATTERY-CASING OCCUPANCY RATIO OF INSERT N1 | BUCKLING INDEX VALUE (C1/S1) | OK WHEN (C1/S1) IS LESS THAN OR EQUAL TO 1.001, OR NG OTHERWISE |
|---|---|---|---|---|
| EXAMPLE1 | 13.4 | 0.93 | 1.0005 | OK |
| COMPARATIVE EXAMPLE1 | 12.5 | 0.90 | 1.0171 | NG |
| EXAMPLE2 | 12.5 | 0.92 | 1.0006 | OK |
| COMPARATIVE EXAMPLE2 | 17.5 | 0.94 | 1.0052 | NG |
| EXAMPLE3 | 17.5 | 0.96 | 1.0007 | OK |
| COMPARATIVE EXAMPLE3 | 26.5 | 0.92 | 1.0128 | NG |
| COMPARATIVE EXAMPLE4 | 26.5 | 0.92 | 1.0148 | NG |
| COMPARATIVE EXAMPLE5 | 26.5 | 0.93 | 1.0079 | NG |
| EXAMPLE4 | 26.5 | 0.96 | 1.0004 | OK |

In the results of FIG. 12 for the four Examples and five Comparative Examples having the outer shape thickness of the battery casing 12 within a range of greater than or equal to 12 mm and less than or equal to 27 mm, if the buckling index value (C1/S1) of less than or equal to 1.001 is taken as a passing reference value for the flexure of the electrode element 16, the following may be found.

If the in-battery casing occupancy ratio N1 of the insert is used as a value indicating the predetermined pressurization state, in order to achieve the buckling index value (C1/S1) of less than or equal to 1.001, the secondary battery is to be pressurized to achieve $0.92 \leq N1 < 0.98$ when the outer shape thickness of the battery casing 12 is greater than or equal to 12 mm and less than 17 mm. The secondary battery is to be pressurized to achieve $0.94 < N1 < 0.98$ when the outer shape thickness of the battery casing 12 is greater than or equal to 17 mm and less than or equal to 27 mm. In this manner, by applying the pressurization to achieve the suitable in-battery-casing occupancy ratio N1 of the insert corresponding to the size of the battery casing 12, it becomes possible to effectively suppress the flexure of the electrode element 16.

According to the method of producing the non-aqueous electrolyte secondary battery 10 of the above-described structure, the secondary battery is pressurized from the outside of the battery casing 12 to achieve a suitable value for the in-battery-casing occupancy ratio N1 of the insert corresponding to the size of the battery casing 12, and the charge/discharge inspection is then performed. With this configuration, occurrence of distortion due to the expansion and contraction of the electrode plate caused by the charging and discharging can be suppressed, and occurrence of the flexure which is a buckling for the flat-shape, rolled-type electrode element 16 can be suppressed. When the flexure occurs in the flat-shape, rolled-type electrode element 16, an inter-electrode distance is increased and a cell resistance is increased. In addition, a high stress portion is generated due to the flexure, and a reaction force is increased. Further, due to the increase of the inter-electrode distance caused by the flexure, an overvoltage is increased, resulting in irreversible degradation such as decomposition of the electrolyte solution, deposition of Li, elution of the positive electrode active material, or the like, which consequently results in reduction of endurance. According to the method of producing the non-aqueous electrolyte secondary battery 10 of the above-described structure, these may be suppressed, and the non-aqueous electrolyte secondary battery 10 may be provided which has a low resistance, a low reaction force, and a superior endurance. Further, during the charge/discharge inspection of the non-aqueous electrolyte secondary battery 40, the non-aqueous electrolyte secondary battery before inspection 40 may be constrained from the outside, so that gas accumulation which occurs during the charge/discharge inspection can be suppressed. Thus, the time for the charge/discharge inspection may be shortened, and precision of a voltage inspection can be improved.

REFERENCE SIGNS LIST 10 (NON-AQUEOUS ELECTROLYTE) SECONDARY BATTERY; 12 BATTERY CASING; 14 LID ELEMENT; 15 RECTANGULAR PLATE PORTION; 16 (FLAT-SHAPE, ROLLED-TYPE) ELECTRODE ELEMENT; 18 NON-AQUEOUS ELECTROLYTE SOLUTION; 20 ELECTRODE ELEMENT HOLDER (INSULATOR); 22 POSITIVE ELECTRODE EXTERNAL TERMINAL; 24 NEGATIVE ELECTRODE EXTERNAL TERMINAL; 26 SOLUTION INJECTION PORT; 28 GAS DISCHARGE PORT; 30 POSITIVE ELECTRODE ELECTRICITY COLLECTOR PLATE; 32 NEGATIVE ELECTRODE ELECTRICITY COLLECTOR PLATE; 34 ELECTRODE ELEMENT POSITIVE ELECTRODE; 36 ELECTRODE ELEMENT NEGATIVE ELECTRODE;

38 LID ELEMENT WITH ELECTRODE ELEMENT; 40 NON-AQUEOUS ELECTROLYTE SECONDARY BATTERY (BEFORE INSPECTION); 42 ROLLED-TYPE ELECTRODE ELEMENT; 46,50 SEPARATOR; 48 POSITIVE ELECTRODE PLATE; 48a ALUMINUM-BASED METAL FOIL; 48b POSITIVE ELECTRODE ACTIVE MATERIAL MIXTURE LAYER; 52 NEGATIVE ELECTRODE PLATE; 52a COPPER-BASED METAL FOIL; 52b NEGATIVE ELECTRODE ACTIVE MATERIAL MIXTURE LAYER; 56, 58 SIDE SURFACE; 60, 62 PRESSURIZATION JIG; 70 INNERMOST ROLLING TRAJECTORY; 72 STRAIGHT LINE.

The invention claimed is:

1. A method of producing a non-aqueous electrolyte secondary battery, the method comprising steps of:
   forming an intermediate product by an order of sub-steps of:
      providing a positive electrode plate, a negative electrode plate, and a separator;
      forming a flat-shape, rolled-type electrode element by placing the separator having ion transmissivity between the positive electrode plate and the negative electrode plate;
      providing a battery casing having an opening;
      inserting in the opening of the battery an insert including at least the flat-shape, rolled-type electrode element;
      closing the opening of the battery casing by a lid element; and
      injecting a non-aqueous electrolyte solution into the battery casing to form the intermediate product;
   pressuring of the battery casing by an operatively associated pressurization jig;
   pressurizing a pressurization region at an outer side of the battery casing with the pressurization jig, such that the intermediate product reaches a predetermined pressurization state;
   wherein in the predetermined pressurization state, an in-battery-casing occupancy ratio N1 is in a range of equal to or greater than 0.92 and less than 0.98, where $N1=E1/T1$,
   E1 is a total thickness of the insert along a direction parallel to a thickness direction of the flat-shape, rolled-type electrode element in the battery casing in a pressurized state, and
   T1 is an inner size of the battery casing along the direction parallel to the thickness direction of the flat-shape, rolled-type electrode element; and
   executing a charge/discharge inspection under the predetermined pressurization state.

2. The method of producing the non-aqueous electrolyte secondary battery according to claim 1, wherein
   the in-battery-casing occupancy ratio N1 in the predetermined pressurization state is in a range of:
   equal to or greater than 0.92 and less than 0.98 where the battery casing has an outer shape thickness of greater than or equal to 12 mm and less than 17 mm, and
   greater than 0.94 and less than 0.98 where the battery casing has an outer shape thickness of greater than or equal to 17 mm and less than or equal to 27 mm.

3. The method of producing the non-aqueous electrolyte secondary battery according to claim 1, further comprising a step of
   determining a length of the pressurization region along a first direction perpendicular to a rolling axis direction and parallel to a direction in which a flat portion of the flat-shape, rolled-type electrode element extends, so as to satisfy $L1 \leq L2$, $L1 < L3$, and $L1 > L4$, where
   L1 is the length of the predetermined pressurization region along the first direction,
   L2 is a length of the flat portion of the flat shape of the flat-shape, rolled-type electrode element along the first direction,
   L3 is an overall length of the flat-shape, rolled-type electrode element along the first direction, and
   L4 is a length between respective ends of an innermost rolling portion of the flat-shape, rolled-type electrode element along the first direction.

4. The method of producing the non-aqueous electrolyte secondary battery according to claim 1, wherein
   the providing the battery casing includes forming the battery casing from aluminum or an aluminum alloy, and
   a thickness of a portion of the battery casing corresponding to the predetermined pressurization region is less than or equal to 1.00 mm.

5. The method of producing the non-aqueous electrolyte secondary battery according to claim 1, wherein
   after the execution of the charge/discharge inspection, when an actual length along a trajectory path of an innermost rolling trajectory connecting respective ends of an innermost rolling portion of the flat-shape, rolled-type electrode element is C1 and a straight line distance connecting respective ends of the innermost rolling trajectory is S1, $1.000 < (C1/S1) < 1.0001$.

6. The method of producing the non-aqueous secondary battery according to claim 1, wherein
   the insert further comprises an electrode element holder between the battery casing and the flat-shape, rolled-type electrode element,
   wherein the in-battery-casing occupancy ratio N1 of the insert is based on an expression of: $N1=(M0+2 \times t1)/T1$, where
   M0 is a thickness of the flat-shape, rolled-type electrode element,
   t1 is a thickness of the electrode element holder, and
   $(M0+2 \times t1)$ represents a total thickness of the insert in the battery casing including the flat-shape, rolled-type electrode element and the electrode element holder.

* * * * *